(12) United States Patent
Sanga

(10) Patent No.: US 9,180,549 B2
(45) Date of Patent: Nov. 10, 2015

(54) WAVELENGTH CONVERSION MEMBER, LIGHT EMITTING DEVICE, AND METHOD OF MANUFACTURING LIGHT EMITTING DEVICE

(71) Applicant: NICHIA CORPORATION, Anan-shi, Tokushima (JP)

(72) Inventor: Daisuke Sanga, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 0 days.

(21) Appl. No.: 14/468,691

(22) Filed: Aug. 26, 2014

(65) Prior Publication Data

US 2015/0062904 A1   Mar. 5, 2015

(30) Foreign Application Priority Data

Aug. 28, 2013   (JP) ................................. 2013-177266

(51) Int. Cl.
| | |
|---|---|
| *F21V 23/02* | (2006.01) |
| *B23K 20/00* | (2006.01) |
| *B23K 1/00* | (2006.01) |

(52) U.S. Cl.
CPC ............. *B23K 20/004* (2013.01); *B23K 1/0016* (2013.01); *B23K 2201/42* (2013.01)

(58) Field of Classification Search
CPC . B23K 20/004; B23K 1/0016; B23K 2201/42
USPC ................................................. 362/260, 257
See application file for complete search history.

(56) References Cited

U.S. PATENT DOCUMENTS

| | | |
|---|---|---|
| 2008/0121911 A1 | 5/2008 | Andrews et al. |
| 2010/0149816 A1 | 6/2010 | Higashi et al. |

FOREIGN PATENT DOCUMENTS

| | | |
|---|---|---|
| JP | 2002-118293 A | 4/2002 |
| JP | 2003-007929 A | 1/2003 |
| JP | 2007-080876 A | 3/2007 |
| JP | 2007-103901 A | 4/2007 |
| JP | 2008-166740 A | 7/2008 |
| JP | 2009-534864 A | 9/2009 |
| JP | 2009-260179 A | 11/2009 |
| JP | 2010-141273 A | 6/2010 |
| JP | 2013-038151 A | 2/2013 |
| WO | 2007-133301 A2 | 11/2007 |

*Primary Examiner* — Vip Patel
(74) *Attorney, Agent, or Firm* — Global IP Counselors, LLP

(57) ABSTRACT

Provided is a wavelength conversion member, a light emitting device, and a method of manufacturing the light emitting device, with which leakage of unconverted light and contamination of an upper surface of an electrode are prevented, and restriction on a position at which the electrode is to be provided on the light-emitting element is eliminated. The wavelength conversion member provided on a light extracting side of a light-emitting element having an electrode on the light extracting side and configured to convert a wavelength of outgoing light from the light-emitting element includes: a wavelength converting plate having a phosphor excited by the outgoing light, and a through-hole penetrating between a front surface and a back surface so as to correspond to the electrode; and a via electrode made of a conductive material filled in the through-hole, and having an upper surface exposed at the front surface of the wavelength converting plate.

9 Claims, 5 Drawing Sheets

WAVELENGTH CONVERSION MEMBER, LIGHT EMITTING DEVICE, AND METHOD OF MANUFACTURING LIGHT EMITTING DEVICE

CROSS-REFERENCE TO RELATED APPLICATION

This application claims priority to Japanese Patent Application No. 2013-177266, filed on Aug. 28, 2013. The entire disclosure of Japanese Patent Application No. 2013-177266 is hereby incorporated herein by reference.

BACKGROUND OF THE INVENTION

1. Field of the Invention

The present invention relates to a wavelength conversion member for converting a wavelength of light emitted from a light-emitting element, a light emitting device including the wavelength conversion member, and a method of manufacturing the light emitting device.

2. Description of Related Art

Typically, a light emitting device has a structure which employs a wavelength conversion member such as YAG (yttrium aluminum garnet) glass. The wavelength conversion member used for such a light emitting device is to convert a wavelength of light emitted from a light-emitting element and is disposed on a light extracting side of the light-emitting element.

JP 2008-166740A and JP 2007-80876A respectively illustrate a wavelength conversion member which is, in a case where an electrode of a light-emitting element is disposed at the light extracting side, configured such that an upper surface of the electrode is exposed at a front surface of the wavelength conversion member so that the wavelength conversion member can be bonded to the upper surface of the electrode by wire bonding.

The wavelength conversion member illustrated in JP 2008-166740A includes a through-hole which penetrates through the front surface and back surface so that the electrode of the light-emitting element is inserted into the through-hole of the wavelength conversion member to expose the upper surface of the electrode which is inserted in the through-hole at the front surface of the wavelength conversion member. In a plurality of wavelength conversion members illustrated in JP 2007-80876A an end of each wavelength conversion member is formed with a cutout shape So that abutting the ends of the plurality of wavelength conversion members allows the cutouts constitute a through-hole penetrating in a thickness direction. Ends of the plurality of wavelength conversion members are engaged so as to hold the electrode from both sides. Thus, the upper surface of the electrode which is in the through-hole is exposed at the front surface of the wavelength conversion member.

However, in the case where a through-hole is formed in the wavelength conversion member as described in JP 2008-166740A and JP 2007-80876A, there is a necessity to consider a tolerance for securely accommodating the electrode in the through-hole at the time of designing. Accordingly, in the conventional wavelength conversion member, a gap may be produced between the wavelength conversion member and the electrode, and unconverted light may leak through the gap around the electrode. In addition, with the configuration disclosed in JP 2007-80876 A, it is extremely difficult to engage the end portions of the wavelength conversion members precisely with each other so as not to produce a gap between the wavelength conversion members. Accordingly, unconverted light may leak through the connecting portion between the wavelength conversion members.

Further, according to the configuration disclosed in JP 2008-166740 A, in the case where an adhesive material is applied on the light extracting side of a light emitting element so that the wavelength conversion member can be adhered, the adhesive agent may stick to the upper surface of the electrode. The sticking of the adhesive agent results in contamination of a bonding pad, which may prevent the wire from attaching to the bonding pad.

Moreover, in the case where the wavelength conversion member is to be disposed on a light-emitting element which has an electrode disposed on an outer circumferential end side of an upper surface of the light-emitting element, and where a through-hole is formed in the wavelength conversion member as in a known device, a cutout shape is formed in an outer circumferential end of the wavelength conversion member. In this case, as the wavelength conversion member does not encircle the entire outer circumference of the electrode, which may result in unconverted light leaking through the part of the outer circumference of the electrode that is not encircled by the wavelength conversion member. Accordingly, in order to manufacture a wavelength conversion member the electrode on the upper surface of the light-emitting element has to be arranged at a position where the wavelength conversion member encircles the entire outer circumference of the electrode of the light-emitting element. Thus, the electrode cannot be arranged at the outer circumferential end-side of the light-emitting element.

SUMMARY OF THE INVENTION

Accordingly, an object of the present disclosure (embodiments) is to provide a wavelength conversion member, a light emitting device, and a method of manufacturing the light emitting device that can prevent leakage of unconverted light and contamination of an upper surface of an electrode, and to eliminate positional limitation on a position at which the electrode is to be provided.

A wavelength conversion member according to the embodiments is arranged (disposed) on a light extracting side of a light-emitting element which has an electrode on the light extracting side to convert a wavelength of light emitted from the light-emitting element. The wavelength conversion member includes a wavelength converting plate and a via electrode. The wavelength converting plate contains a phosphor to absorb the emitting light and formed with a through-hole penetrating through a front surface to a back surface in conformity to the electrode. The via electrode is made of a conductive material filled in the through-hole and has an upper surface exposed at the front surface of the wavelength converting plate.

Further, a light emitting device according to the embodiments includes a light-emitting element which has an electrode on its light extracting side, the wavelength conversion member as described above, disposed on the light extracting side and has a via electrode arranged to face the electrode, and a metal joined portion provided between the electrode and the via electrode to join the electrode and the via electrode.

Moreover, a method of manufacturing a light emitting device according to the present invention is a method of manufacturing a light emitting device from a wavelength conversion original plate having a plurality of wavelength conversion members each as defined above, and a group of a plurality of light-emitting elements disposed on a substrate, each of the light-emitting elements having an electrode on a light extracting side, and the method includes: a metal-joining step of metal-joining via electrodes of the wavelength conversion members in the wavelength conversion original plate with the electrodes in the group of the light-emitting elements; an adhesive joining step of filling a light transmissive resin into a gap between the wavelength conversion original plate and the group of the light-emitting elements that have been metal joined and causing the wavelength conversion original plate and the group of the light-emitting elements to be adhered; and a dicing step of dicing the wavelength conversion original plate and the group of the light-emitting elements that have been adhered.

According to the wavelength conversion member and the light emitting device of the present invention, it is possible to prevent leakage of unconverted light and contamination of a bonding pad, and to eliminate restriction on a position at which an electrode is to be provided.

According to the method of manufacturing a light emitting device of the present invention, it is possible to manufacture a light emitting device capable of preventing leakage of unconverted light and contamination of a bonding pad, and provided with a light-emitting element having an electrode on an outer circumferential end. Further, as a via electrode is directly provided for the wavelength conversion member, it is not necessary to consider a tolerance as in the conventional technique when the wavelength conversion member is attached to the light-emitting element.

DETAILED DESCRIPTION OF EMBODIMENT

Figure 1:
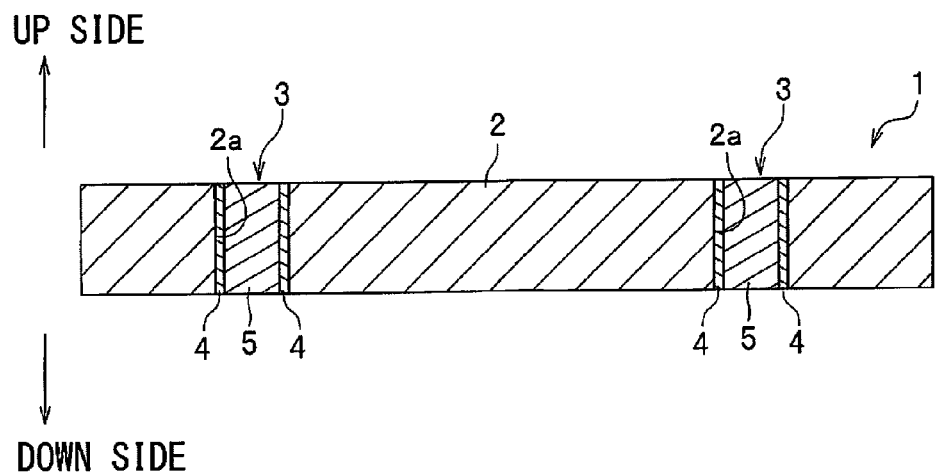
FIG. 1 is a sectional view in a thickness direction of a wavelength conversion member according to an embodiment.

Hereinafter, embodiments of a wavelength conversion member according to the present invention will be described with reference to the drawings. Throughout the drawings, sizes of and positional relation between components may be shown exaggeratedly in order to make the description clearer. Further, in the following description, like names and like reference numerals denote like components or similar components, and descriptions for these components shall be omitted if appropriate.

(Wavelength Conversion Member 1)

As illustrated in FIG. 1, a wavelength conversion member 1 is disposed on a light extracting side of a light-emitting element 20 (see FIG. 2) to convert a wavelength of light emitted from the light-emitting element 20 into a long wavelength. The wavelength conversion member 1 includes a plate-shaped wavelength converting plate 2 having through-holes 3, light transmissive layers 4 fixedly attached respectively to inner circumferential surfaces 2a of the wavelength converting plate 2 in the through-holes 3, and via electrodes 5 disposed respectively within the through-holes 3, all of which components are integrally provided.

(Wavelength Converting Plate 2)

The wavelength converting plate 2 is made of a mixture of a fluorescent material, a fluorescent pigment, and/or a fluorescent dye (hereinafter may collectively referred to as "fluorescent material") into a light transmissive base material which has light transmissivity such as glass, ceramics, or resin, or made of a sintered body of the fluorescent material which is obtained without the use of a base material.

(Through-Holes 3)

The through-holes 3 are provided for forming the via electrodes 5 within the wavelength converting plate 2, and penetrate the wavelength converting plate 2 in the thickness direction. The locations to define the through-holes are in conformity to the pad electrodes 25 of the light-emitting element 20, in the case where the wavelength conversion member 1 is disposed on the light extracting side of the light-emitting element (see FIG. 2).

(Light Transmissive Layers 4)

Referring to FIG. 1, the light transmissive layers 4 are fixedly attached respectively to the inner circumferential surfaces 2a of the wavelength converting plate 2 so as to cover the corresponding inner circumferential surfaces 2a. In the case where the wavelength converting plate 2 is made including a base material such as glass, ceramics, or resin, the light transmissive layers 4 are made of a material which has a refraction index lower than a refraction index of the base material. In the case where the wavelength converting plate 2 is made of a sintered body of the fluorescent material which is obtained without the use of a base material, the light transmissive layers 4 are made of a material having a refraction index lower than a refraction index of the fluorescent material such as YAG. The light transmissive layers 4 can facilitate the light advancing toward the via electrodes 5 within the wavelength converting plate 2 to be totally reflected at the interfaces between the inner circumferential surfaces 2a of the wavelength converting plate 2 and the light transmissive layers 4 (see an arrow A shown in FIG. 2). Accordingly, even when light is directed onto the via electrodes 5, the amount of light absorbed by the via electrodes 5 can be reduced. As a result, reduction in the amount of light extracted from the wavelength converting plate 2 can be prevented. Examples of the material that constitutes the light transmissive layers 4 include $MgF_2$ and $SiO_2$. The thickness of the light transmissive layers 4 is preferably at least 0.1 μm or greater, and more preferably 0.3 μm or greater.

(Via Electrodes 5)

Referring to FIG. 1, the via electrodes 5 are electrodes provided by filling a conductive material into the through-holes 3. Accordingly, the through-holes 3 in the wavelength converting plate 2 are filled with the conductive material so that no gap is produced between the via electrodes 5 and the wavelength converting plate 2. Further, the via electrodes 5 extend along the through-holes 3 in the thickness direction. Accordingly, the upper surface of each of the via electrodes 5 is exposed at an upper surface side of the wavelength converting plate 2 so as to allow wire bonding (see FIG. 2). On the other hand, a lower surface of each of the via electrodes 5 is exposed at a lower surface of the wavelength converting plate 2 so as to be allow joining with the corresponding electrode of the light-emitting element (see FIG. 2).

Figure 2:
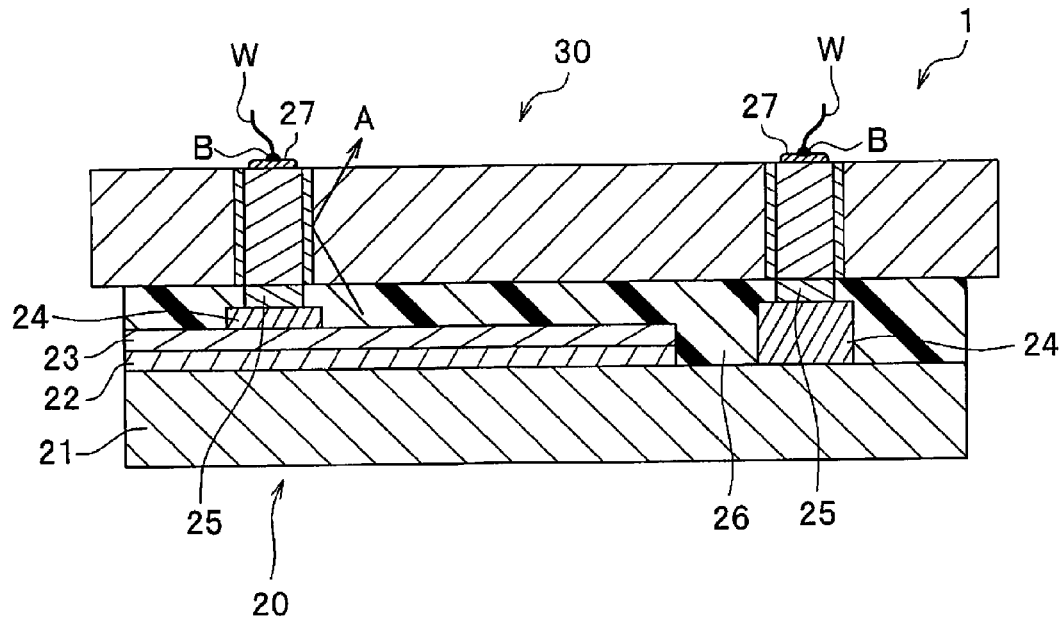
FIG. 2 is a sectional view in a thickness direction of a light emitting device which includes the wavelength conversion member according to an embodiment.

Next, a light emitting device 30 which employs the wavelength conversion member 1 will be described. Referring to FIG. 2, the light emitting device 30 includes the light-emitting element 20 which has the pad electrodes 24, 24 on the light extracting side the wavelength conversion member 1 disposed on the light extracting side of the light-emitting element 20; metal joining portions 25, 25 respectively disposed between the pad electrodes 24, 24 and the via electrodes 5, 5; and a light transmissive resin layer 26 filled between the light-emitting element 20 and the wavelength conversion member 1.

(Light-Emitting Element 20)

The light-emitting element 20 includes an n-type semiconductor layer 21 disposed on a substrate that is not depicted; an active layer 22 disposed on the n-type semiconductor layer 21 a p-type semiconductor layer 23 disposed on the active layer 22; and the pair of pad electrodes 24, 24 respectively provided for the n-type semiconductor layer 21 and the p-type semiconductor layer 23. The light-emitting element 20 of the present embodiment is a face-up type in which the pad electrodes 24, 24 are provided on the light extracting side, but is not limited thereto and may be a lamination type in which the electrodes are arranged separately on different sides.

Each of the metal joining portions 25 is provided for electrically connecting the corresponding pad electrode 24 with the corresponding via electrode 5 by metal joining the upper surface of the pad electrode 24 of the light-emitting element 20 with the lower surface of the via electrode 5 of the wavelength conversion member 1. Also, the light transmissive resin layer 26 is provided for strengthening the joining between the light-emitting element 20 and the wavelength conversion member 1 by adhering to both of the light-emitting element 20 and the wavelength conversion member 1. Thus, the electrical connection between the via electrodes 5 and the pad electrodes 24 obtained at the metal joining portions 25 can be hardly disconnected. With the arrangement described above, the pad electrodes 24 disposed on the light extracting side and a wire W arranged on a front surface side of the wavelength conversion member 1 can be electrically connected.

(Method of Manufacturing Wavelength Conversion Member 1)

Figure 3:
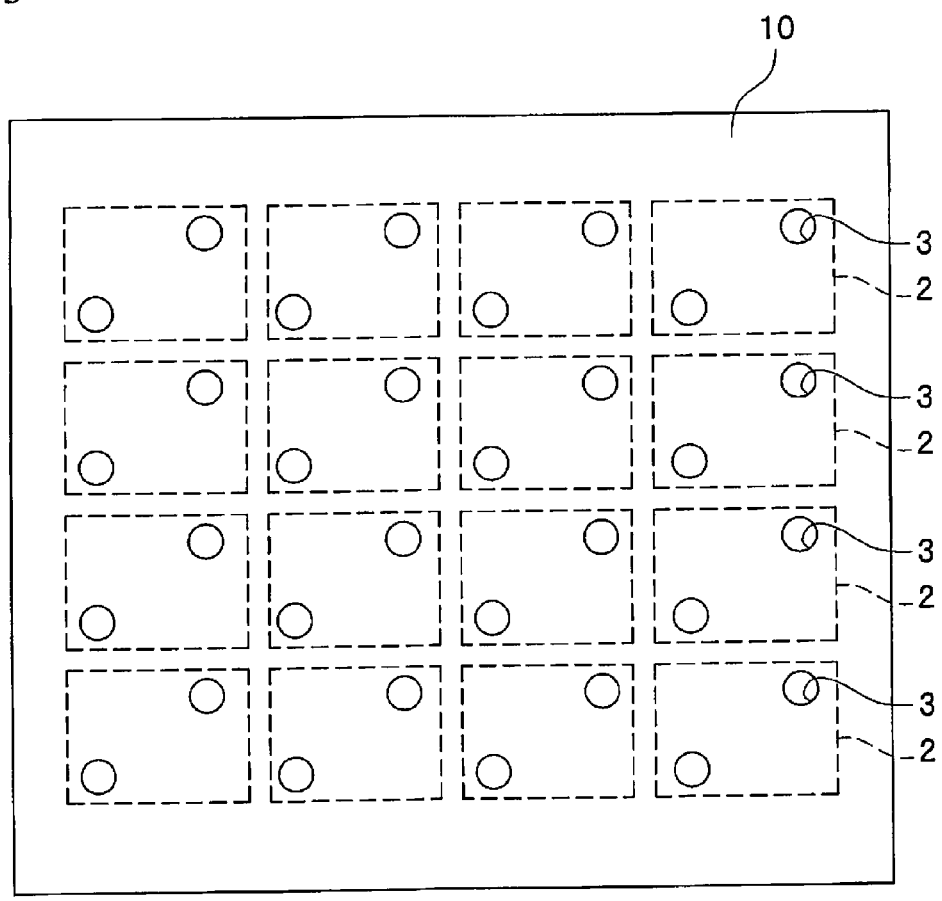
FIG. 3 is a plan view seen from above a wavelength conversion original plate according to an embodiment.

Next, a method of manufacturing the wavelength conversion member 1 according to an embodiment will be described. First, manufacturing of the wavelength converting plate 2 will be described. As illustrated in FIG. 3, in order to improve a manufacturing efficiency, the wavelength converting plate 2 of a desired size may be obtained by dicing a wavelength conversion original plate 10 of a size which can accommodate a plurality of wavelength converting plates 2. In the present embodiments, the timing at which the wavelength conversion original plate 10 to be diced is not particularly limited. Specifically, the wavelength conversion original plate 10 may be diced after the light transmissive layers 4 and the via electrodes 5 are formed on the wavelength conversion original plate 10. Alternatively, the wavelength conversion original plate 10 may be diced before the light transmissive layers 4 and the via electrodes 5 are formed on the wavelength conversion original plate 10. A case in which the wavelength conversion original plate 10 to be diced after the light trans- missive layers 4 and the via electrodes 5 are formed on the wavelength conversion original plate 10 will be described below.

Next, as illustrated in FIG. 3, the through-holes 3 are defined to penetrate through the wavelength conversion original plate 10 in the thickness direction. Examples of the method of forming the through-holes 3 include cutting, shot blasting, and laser processing. In the embodiments, the shape which defined the through-holes 3 is not specifically limited, and the through-holes 3 may be tapered to be described below so as to make it easier to provide the light transmissive layers 4 or a seed layer to be described below, on the inner circumferential surfaces 2a of the wavelength conversion original plate 10.

Next, the light transmissive layers 4 are formed on the inner circumferential surfaces 2a of the wavelength conversion original plate 10 in the through-holes 3 (see FIG. 1). Examples of the method of forming the light transmissive layers 4 include film formation methods such as spin-on glass application, CVD (Chemical Vapor Deposition), ALD (Atomic Layer Deposition), sputtering, and vapor deposition.

Further, an inner space which allows for disposing the via electrode 5 is needed to be provided in the inner circumferential surface side of the light transmissive layer 4. Accordingly, in the case where the inner space in the light transmissive 4 is narrow due to the method employed to dispose the layer which is described above the inner circumferential surface side of the light transmissive layer 4 may be cut to obtain a desired dimensions. As another example of the method of forming the light transmissive layers 4, the through-holes 3 may be filled by using a method such as spin-on glass application, CVD, ALD, sputtering, or vapor deposition, and then the inner spaces for forming the via electrodes 5 are respectively formed within the corresponding holes by cutting.

Next, the via electrodes 5 are formed by filling a conductive material within the through-holes 3 of the wavelength conversion original plate 10 (see FIG. 1). Examples of the method of filling the conductive material to the via electrodes 5 include the following two.

A first method of filling the conductive material into the through-holes 3 includes providing a seed layer that is not depicted over each of the inner circumferential surfaces of the light transmissive layers 4 using such as CVD, sputtering, or vapor deposition, and then attaching the conductive material to an inner circumferential surface of the seed layer using plating to fill the corresponding through-hole 3. In order to prevent a portion made of the conductive material from absorbing light, it is preferable that the seed layer be made of a highly reflective metal such as Al and Ag. Further, the seed layer is included in a "metallic layer" as defined in the scope of the claims.

A second method of filling the conductive material into the through-holes 3 includes filling the through-holes 3 with a conductive paste which contains the conductive material, and then firing. Further, in the case in which glass or ceramic is used as the base material of the wavelength converting plate 2, firing of the conductive paste filled within the through-holes 3 may be performed at the same time when firing glass or ceramic as the base material of the wavelength converting plate 2. In addition, in the case where the via electrodes 5 are formed by using the second method, the metallic layer may also be made of a highly reflective metal such as Al and Ag by using such as CVD, sputtering, or vapor deposition in order to reduce light absorption by the portion made of the conductive material.

Next, after the via electrodes 5 are formed on the wavelength conversion original plate 10, a front surface and a back surface of the wavelength conversion original plate 10 are polished and finished. Then, in order to facilitate the metal joining using wire bonding, bonding pads 27 are respectively formed on the upper surfaces of the via electrodes 5 of the finished wavelength conversion original plate 10 using flash plating or cap patterning of gold, silver, copper, platinum, or an alloy of these metals (see FIG. 2 and FIG. 4). In the present invention, the process of providing the bonding pads 27 may be performed using a method of manufacturing the light emitting device 30 to be described below. Next, the wavelength converting plate 2 of desired dimensions may be obtained by dicing the wavelength conversion original plate 10. Thus, an individual piece of the wavelength conversion member 1 as shown in FIG. 1 can be manufactured. As illustrated in FIG. 2, dicing is performed such that the dimensions of the wavelength conversion member 1 is greater than that of the light-emitting element 20 so as to cover the light extracting side of the light-emitting element 20. Further, dicing the wavelength conversion original plate 10 so as to be brought into contact with the via electrodes 5, it is possible to manufacture the wavelength conversion member 1 having an electrode on the side of the outer circumferential end.

In the embodiment described above, the case in which the wavelength conversion member 1 is manufactured by performing dicing only on the wavelength conversion original plate 10, but not limited thereto. For example, the wavelength conversion member 1 may be manufactured as a part of a light emitting device by adhering the wavelength conversion original plate 10 and fixed to a group of light-emitting elements which is a plurality of light-emitting elements 20 disposed on a substrate for growing a semiconductor layer, and then dicing the wavelength conversion original plate 10 along with the semiconductor layer and the substrate for growing to obtain the light emitting devices each having the light-emitting element and the wavelength conversion member. The methods described above require dicing only a single time, so that manufacturing efficiency can be improved.

(Method of Manufacturing Light Emitting Device 30)

Next, a method of manufacturing the light emitting device 30 using the wavelength conversion original plate 10 and the light-emitting element set having the plurality of light-emitting elements 20 disposed on the substrate for growing a semiconductor layer will be described with reference to the drawings. The method of manufacturing the light emitting device 30 includes metal-joining, adhesive-joining, dicing, and wire-bonding.

(Metal-Joining)

Figure 4:
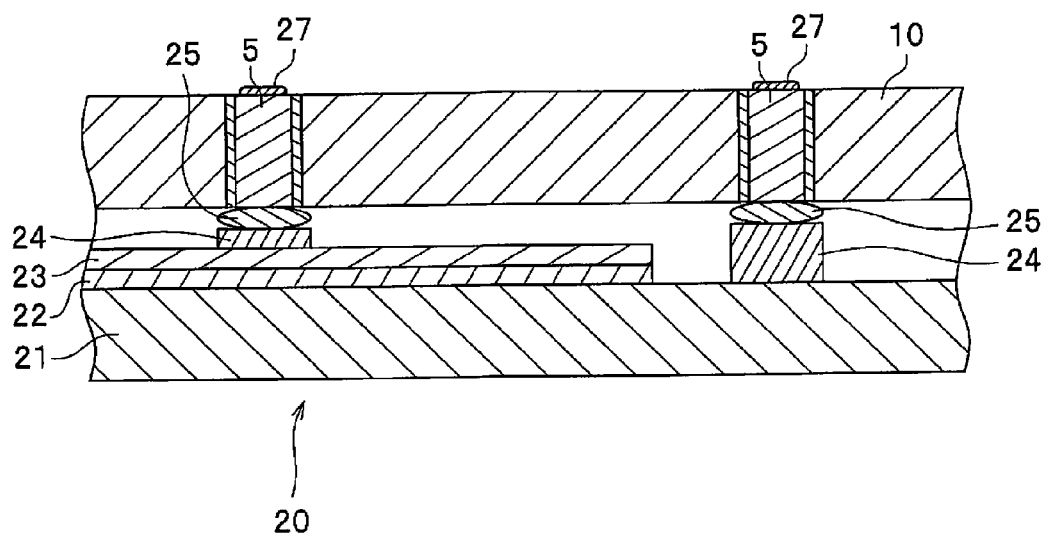
FIG. 4 is a sectional view showing a state in which the wavelength conversion original plate is overlapped with the light-emitting element via a bump in metal-joining according to an embodiment.

As illustrated in FIG. 4, the metal-joining is a step for metal joining the via electrodes 5 of the wavelength conversion original plate 10 and the pad electrodes 24 of the light-emitting element set by providing the metal-joining portions 25 between the via electrodes 5 and the pad electrodes 24. In the metal-joining, first, a bump which is a projecting metal is provided on each of the lower surfaces of the via electrodes 5 and corresponding one of the upper surfaces of the pad electrodes 24. Next, the wavelength conversion original plate 10 and the light-emitting element set are overlapped so that the lower surfaces of the via electrodes 5 are brought into contact with the upper surfaces of the pad electrodes 24, and the bumps are caused to be molten by heating. Then, by solidifying the bumps, as illustrated in FIG. 3, the metal joining portions 25 which is fixedly attached respectively to the lower surfaces of the via electrodes 5 and to the upper surfaces of the pad electrodes 24 are formed.

(Adhesive-Joining)

Figure 5:
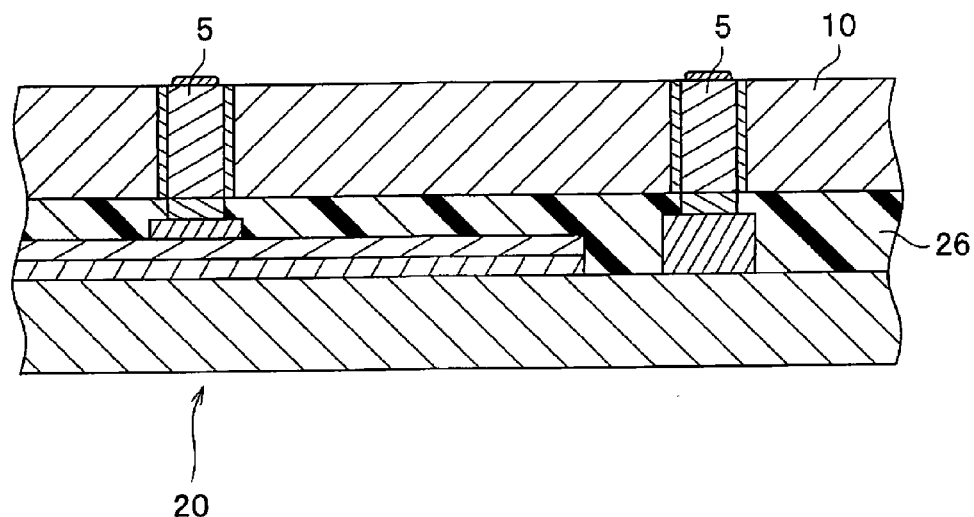
FIG. 5 is a sectional view showing a state in which a light transmissive resin filled between the wavelength conversion original plate and the light-emitting element is hardened in adhesive joining according to an embodiment.

As illustrated in FIG. 5, the adhesive joining is a step for causing the light-emitting element 20 to be adhered with the wavelength conversion original plate 10, by providing the light transmissive resin layer 26 in a gap between the light-emitting element 20 and the wavelength conversion original plate 10. In the adhesive-joining, first, an underfill material such as a thermoset epoxy resin is applied over the n-type semiconductor layer 21 of the light-emitting element 20, and infiltrated into the gap between the light-emitting element 20 and the wavelength conversion original plate 10 by a capillary action. Then, by hardening the underfill material by heating, as illustrated in FIG. 4, the light transmissive resin layer 26 which is fixedly attached to the light-emitting element 20 and the wavelength conversion original plate 10 is formed.

(Dicing)

As illustrated in FIG. 2, the dicing is a step for cutting the light-emitting elements 20 and the wavelength conversion original plate 10 that are provided integrally into individual pieces of a predetermined dimensions using a dicing blade, and thus manufacturing the light emitting device 30.

(Wire-Bonding)

The wire-bonding is a step for electrically connecting the light-emitting element 20 and an external power supply by joining both ends of the wire W respectively to the upper surface of each of the via electrodes 5 and the external power supply as illustrated in FIG. 2. Examples of the method of bonding the wire W include heating and applying a pressure from above as well as ultrasonic vibration while one end of the wire W is in contact with the bonding pad 27 of the upper surface of each of the via electrodes 5. With this, a ball B for joining the bonding pad 27 and the wire W is formed. Examples of a material of the wire W include gold, silver, copper, platinum, and an alloy of these metals.

As described above, with the wavelength conversion member 1 of the embodiment, a gap is not created between the wavelength converting plate 2 and the via electrodes 5, so that unconverted light may not leak through a gap around the via electrodes 5. Further, the wavelength conversion member 1 according to the embodiment is constituted with the wavelength converting plate 2 of a single piece, unconverted light may not leak through between a plurality of wavelength converting plates 2 as illustrated in the reference techniques. Thus, with the wavelength conversion member 1 according to the embodiment, leakage of unconverted light can be prevented.

Moreover, with the wavelength conversion member 1 according to the embodiment, the upper surface of each of the via electrodes 5 on which the bonding pad 27 is provided is positioned on an upper surface side of the wavelength conversion member 1. Accordingly, when an adhesive material is applied to a side of a lower surface of the wavelength conversion member 1 or a light extracting surface of the light-emitting element 20 in order to adhere and fix the wavelength conversion member 1 to the light-emitting element 20, the adhesive material may not stick to the upper surface of each of the via electrodes 5. Thus, with the wavelength conversion member 1 of the embodiment, contamination of the bonding pads 27 can be prevented so that occurrence of a failure in attaching the wire W can be avoided.

Furthermore, the wavelength conversion member 1 of the embodiment can realize manufacturing of the wavelength conversion member 1 in which leakage of unconverted light from the circumference of the via electrode 5 can be prevented, and can be provided with an electrode which is arranged at an outer circumferential end side. Accordingly, the locational limitation that prevented the pad electrodes 24, 24 from being disposed on the side of the outer circumferential end of the light-emitting element 20 can be eliminated.

Figure 7:
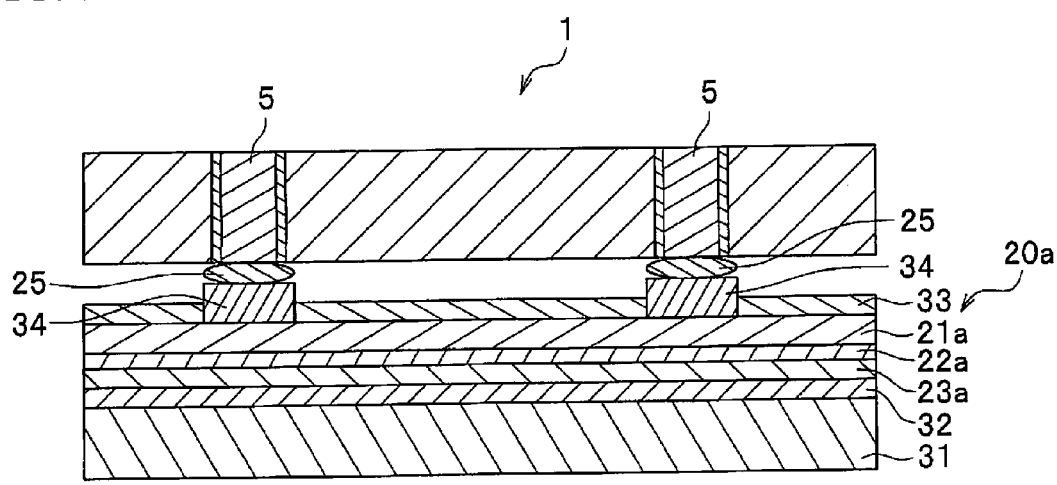
FIG. 7 is a sectional view showing a state in which the wavelength conversion member and a laminated type light-emitting element are engaged via a bump.
Figure 8:
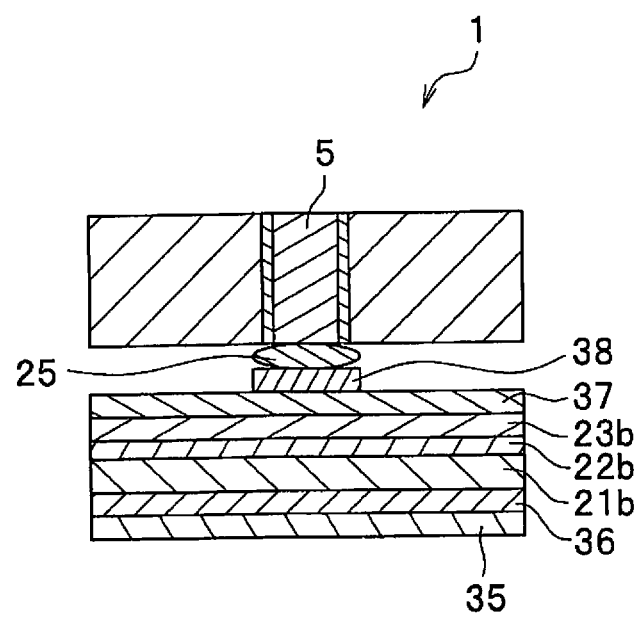
FIG. 8 is a sectional view showing a state in which the wavelength conversion member and a single wire type light-emitting element are engaged via a bump.

While the embodiment has been described, the present invention is not limited to the examples shown in the embodiment. For example, in the embodiment, the face-up light-emitting element 20 having a pair of pad electrodes 24, 24 disposed on the light extracting side (on the side of the upper surface) is employed, but the present invention is not limited to such an example. The present invention may be applied to a vertically conductive light-emitting element having electrodes both on the side of the upper surface and the side of the lower surface. Examples of the vertical conduction type light-emitting element include a laminated type light-emitting element 20a to which a supporting substrate 31 is laminated (see FIG. 7), and a single wire type light-emitting element 20b in which only one wire is bonded, because only one pad electrode is disposed on the side of upper surface (see FIG. 8). More specifically, an example of the lamination type light-emitting element 20a is configured such that a reflective electrode 32, a p-type semiconductor layer 23a, an active layer 22a, an n-type semiconductor layer 21a, and a protective layer 33 are stacked in the stated order over the supporting substrate 31, and a plurality of n-pad electrodes 34, 34 are disposed on an upper surface of the n-type semiconductor layer 21a. Further, an example of the one wire light-emitting element 20b is configured such that a reflective electrode 35, an n-type semiconductor 21b, an active layer 22b, a p-type semiconductor layer 23b, a full-scale electrode 36, and a p-pad electrode 37 are stacked in the stated order from the bottom. Alternatively, with a method of manufacturing a light emitting device by combining the wavelength conversion member 1 according to the present invention with one of the lamination type light-emitting element 20a and the one wire light-emitting element 20b, it is possible to provide a light emitting device with reduced leakage of unconverted light and to prevent contamination of the bonding pad 27. Even when employing the lamination type light-emitting element 20a or the one wire light-emitting element 20b described above, it is also desirable that a resin be filled between the light-emitting element and the wavelength conversion member 1 after metal joining in view of a light extracting efficiency.

Figure 6:
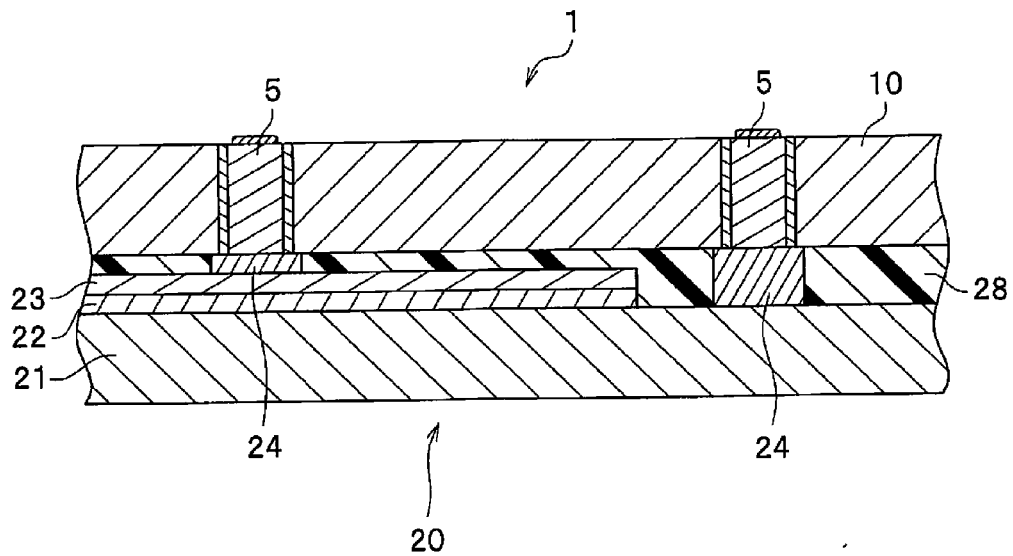
FIG. 6 is a sectional view in a thickness direction of a light emitting device, where the wavelength conversion member according to an embodiment is directly joined with the wavelength conversion member according to an embodiment.

Further, in this embodiment, the electrode surfaces of the wavelength conversion member 1 and the electrode surfaces of the light-emitting element 20 are joined by providing the metal joining portions 25 respectively between the lower surfaces of the via electrodes 5 and the upper surfaces of the pad electrodes 24, but the present invention is not limited to such an example. Moreover, in this embodiment, a non-electrode surface of the wavelength conversion member 1 and a non-electrode surface of the light-emitting element 20 are joined by providing the light transmissive resin layer 26 between the lower surface of the wavelength converting plate 2 and the upper surface of the semiconductor structure, but the present invention is not limited to such an example. For example, as illustrated in FIG. 6, the light emitting device 30 may be manufactured by directly joining the electrode surfaces and the non-electrode surface of the wavelength conversion member 1 to the electrode surfaces and the non-electrode surface of the light-emitting element 20. Examples of the direct joining include room-temperature-bonding techniques such as surface activated bonding, atomic diffusion bonding, and hydroxyl bonding. As used herein, surface activated bonding refers to a method of bonding by performing a front surface treatment to bonding surfaces in vacuum so as to activate atoms at the bonding surfaces so as to be chemically bonded, and overlapping the bonding surfaces. Atomic diffusion bonding refers to a method of bonding by forming microcrystalline films over the bonding surfaces in ultrahigh vacuum, and overlapping the microcrystalline films in vacuum. Hydroxyl bonding refers to a method of bonding by hydrophilicating the bonding surfaces over which thin oxidized films are provided by causing hydroxyl to be adhered to the surfaces, and overlapping the hydrophilicated bonding surfaces with each other. However, when performing the direct bonding, in order to make the upper surface of the light-emitting element 20 flat, it is necessary to embed an embedding material to provide an embedded layer 28 that is as high as the upper surfaces the pad electrodes 24, 24. In this case, examples of the material of the embedded layer 28 include light transmissive materials having a middle refractive index such as $SiO_2$, $SiO_xN_{(1-x)}$, and $Al_2O_3$. Alternatively, it is possible to directly join the wavelength conversion member 1 to a light-emitting element having, in place of the embedded layer 28, a protective layer that is as high as the upper surfaces of the pad electrodes 24 to make the upper surfaces of the pad electrodes 24 flat. Such direct joining improves light extraction from the light-emitting element to the phosphor layer and heat dissipation of the phosphor, and brightness may be improved as a result. Further, as this eliminates a resin material immediately above the light-emitting element, it is possible to reduce photo-deterioration due to shortwave excitation light and to provide a long-life light-emitting element.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

What is claimed is:

1. A wavelength conversion member arranged on a light extracting side of a light-emitting element which has an electrode on the light extracting side, and configured to convert a wavelength of light emitted from the light-emitting element, the wavelength conversion member comprising:
    a wavelength converting plate including a fluorescent material, a through-hole, a via electrode, a front surface, and a back surface;
    the through-hole penetrating through the front surface and the back surface, and disposed in conformity to the electrode of the light-emitting element; and
    the via electrode made of a conductive material, disposed filling in the through-hole, and including an upper surface exposed at the front surface of the wavelength converting plate.

2. The wavelength conversion member according to claim 1, wherein:
    the via electrode further includes an outer circumferential surface and a metallic layer covering the outer circumferential surface, and
    a reflectance of the metallic layer is higher than a reflectance of the conductive material disposed within the metallic layer.

3. The wavelength conversion member according to claim 1, further comprising:
    a light transmissive layer;
    the through-hole further including an inner circumferential surface;
    the light transmissive layer covering the inner circumferential surface; and
    a refraction index of the light transmissive layer is lower than a refraction index of a base material of the wavelength converting plate.

4. The wavelength conversion member according to claim 3, wherein:
   a thickness of the light transmissive layer is equal to or greater than 0.1 µm.

5. A light emitting device comprising:
   a light-emitting element including a light extracting side and an electrode disposed on the light extracting side;
   a wavelength conversion member as defined in claim 1, the wavelength conversion member disposed on the light extracting side, the via electrode disposed facing the electrode of the light-emitting element; and
   a metal-joining portion provided between the electrode and the via electrode, the metal joining portion joining the electrode with the via electrode.

6. The light emitting device according to claim 5, further comprising:
   a light transmissive resin layer made of a light transmissive resin, the light transmissive resin layer filling a gap between the light-emitting element and the wavelength conversion member.

7. A light emitting device comprising:
   a light-emitting element including an upper surface, a light extracting side, and an electrode on the light extracting side;
   the upper surface of the light-emitting element comprising an electrode surface, and a non-electrode surface;
   a wavelength conversion member as defined in claim 1, the wavelength conversion member disposed on the light extracting side, the via electrode disposed facing the electrode; and
   the wavelength conversion member further comprising a lower surface directly joined to the upper surface of the light-emitting element, the lower surface including a lower surface of the wavelength converting plate and a lower surface of the via electrode.

8. A method of manufacturing a light emitting device from a wavelength conversion original plate and a group of a plurality of light-emitting elements; the wavelength conversion original plate having a plurality of wavelength conversion members, each wavelength conversion member as defined in claim 1; and the group of the plurality of light-emitting elements disposed on a substrate, each of the light-emitting elements having an electrode on a light extracting side of the substrate; the method comprising:
   a metal joining step including joining electrodes of the wavelength conversion members in the wavelength conversion base plate with the electrodes in the group of the light-emitting elements;
   an adhesive joining step after the metal joining step, the adhesive joining step including filling a gap between the wavelength conversion base plate and the group of the light-emitting elements with a light transmissive resin, the light transmissive resin adhering to both the wavelength conversion original plate and the group of light-emitting elements; and
   a dicing step after the adhesive joining step, the dicing step including dicing the wavelength conversion original plate and the group of the light-emitting elements.

9. The method of manufacturing a light emitting device according to claim 8, further comprising:
   a wire-bonding step including bonding a wire to an upper surface of each of the via electrodes after the dicing step.

* * * * *